(12) United States Patent
Zhao et al.

(10) Patent No.: US 11,676,488 B2
(45) Date of Patent: Jun. 13, 2023

(54) METHOD AND SYSTEM FOR DETERMINING AN ATTRIBUTE OF AN OBJECT AT A PRE-DETERMINED TIME POINT

(71) Applicant: Aptiv Technologies Limited, St. Michael (BB)

(72) Inventors: Kun Zhao, Duisburg (DE); Michael Arnold, Düsseldorf (DE)

(73) Assignee: Aptiv Technologies Limited, St. Michael (BB)

( * ) Notice: Subject to any disclaimer, the term of this patent is extended or adjusted under 35 U.S.C. 154(b) by 255 days.

(21) Appl. No.: 17/011,959

(22) Filed: Sep. 3, 2020

(65) Prior Publication Data

US 2021/0107532 A1  Apr. 15, 2021

(30) Foreign Application Priority Data

Oct. 11, 2019  (EP) .................................... 19202631

(51) Int. Cl.
*B60W 60/00*  (2020.01)
*B60W 30/12*  (2020.01)
(Continued)

(52) U.S. Cl.
CPC ............. *G08G 1/163* (2013.01); *B60W 30/12* (2013.01); *B60W 60/00272* (2020.02);
(Continued)

(58) Field of Classification Search
None
See application file for complete search history.

(56) References Cited

U.S. PATENT DOCUMENTS

2009/0172545 A1\* 7/2009 Yokoi ................... G06F 16/51
715/721
2017/0147888 A1  5/2017 Zeng
(Continued)

FOREIGN PATENT DOCUMENTS

AT  515319 A4  8/2015
CN  101002070 A  7/2007
(Continued)

OTHER PUBLICATIONS

"Foreign Office Action", CN Application No. 202011076561.1, dated Apr. 6, 2022, 16 pages.
(Continued)

*Primary Examiner* — James J Lee
*Assistant Examiner* — Tawri M McAndrews
(74) *Attorney, Agent, or Firm* — Sawtooth Patent Group PLLC

(57) ABSTRACT

Disclosed herein are methods and systems for determining an attribute of an object at a pre-determined time point. Data representing a respective property of the object and a plurality of further objects at a plurality of time points different from the pre-determined time point are determined, and the data is arranged in an image-like data structure. The image-like data structure has a plurality of columns and a plurality of rows. The data is arranged in the image-like data structure such that each of one of the rows or the columns corresponds to respective properties of the object or of one of the plurality of further objects and each of the other of the rows or the columns corresponds to respective properties at one of the plurality of time points. The attribute is then determined using a pre-determined rule based on the image-like data structure.

20 Claims, 4 Drawing Sheets

Figure 1:
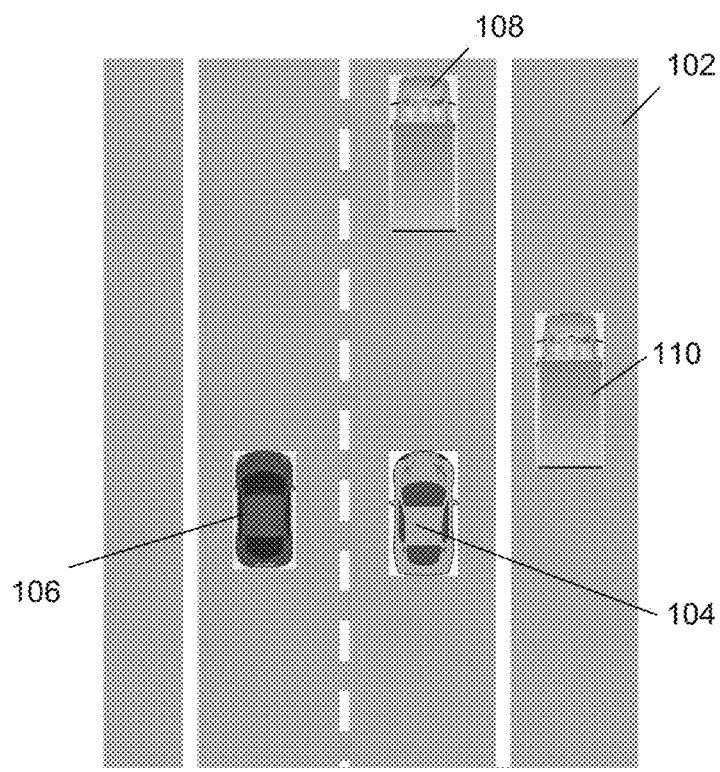

(51) Int. Cl.
| | |
|---|---|
| *G08G 1/16* | (2006.01) |
| *G06N 3/08* | (2023.01) |
| *G06V 20/58* | (2022.01) |
| *G06V 20/56* | (2022.01) |
| *G06V 10/764* | (2022.01) |
| *G06V 10/82* | (2022.01) |

(52) U.S. Cl.
CPC ............ *G06N 3/08* (2013.01); *G06V 10/764* (2022.01); *G06V 10/82* (2022.01); *G06V 20/58* (2022.01); *G06V 20/588* (2022.01); *B60W 2420/42* (2013.01)

(56) References Cited

U.S. PATENT DOCUMENTS

| | | | |
|---|---|---|---|
| 2017/0293837 | A1 | 10/2017 | Cosatto et al. |
| 2018/0089515 | A1 | 3/2018 | Yang et al. |
| 2018/0232585 | A1 | 8/2018 | Kim |
| 2019/0026597 | A1 | 1/2019 | Zeng et al. |
| 2019/0049987 | A1 | 2/2019 | Djuric et al. |
| 2019/0065878 | A1 | 2/2019 | Zeng et al. |
| 2019/0161080 | A1 | 5/2019 | Gochev et al. |
| 2019/0179328 | A1 | 6/2019 | Movert et al. |
| 2019/0212453 | A1 | 7/2019 | Natroshvili et al. |
| 2019/0286153 | A1* | 9/2019 | Rankawat ............ G05D 1/0088 |
| 2020/0019794 | A1 | 1/2020 | Engelcke et al. |
| 2020/0057141 | A1 | 2/2020 | Kim |
| 2020/0082248 | A1* | 3/2020 | Villegas ................ B60W 40/02 |
| 2020/0159232 | A1* | 5/2020 | Refaat .................. G08G 1/0129 |
| 2020/0307562 | A1* | 10/2020 | Ghafarianzadeh ..... G06N 20/00 |
| 2021/0192347 | A1 | 6/2021 | Zhao et al. |
| 2021/0271252 | A1 | 9/2021 | Zhao et al. |

FOREIGN PATENT DOCUMENTS

| | | |
|---|---|---|
| CN | 107636678 A | 1/2018 |
| CN | 108345840 A | 7/2018 |
| CN | 109376594 A | 2/2019 |
| CN | 110210664 A | 9/2019 |
| CN | 111401419 | 7/2020 |
| DE | 102016122190 A1 | 5/2017 |
| DE | 102018117777 | 1/2019 |
| DE | 102018120405 | 2/2019 |
| DE | 102017121052 | 3/2019 |
| EP | 1779295 | 5/2007 |
| EP | 2765533 | 8/2014 |
| EP | 2784722 | 10/2014 |
| EP | 3438872 | 2/2019 |
| EP | 3839805 | 6/2021 |
| WO | 2016130719 | 8/2016 |
| WO | 2017177005 | 10/2017 |
| WO | 2018204656 | 11/2018 |

OTHER PUBLICATIONS

"Extended European Search Report", EP Application No. 20187694.3, dated Dec. 3, 2020, 14 pages.
Wang, et al., "Robust and Fast Vehicle Turn-counts at Intersections via an Integrated Solution from Detection, Tracking and Trajectory Modeling", Jun. 14, 2020, 9 pages.
Xue, et al., "Pedestrian Tracking and Stereo Matching of Tracklets for Autonomous Vehicles", Apr. 28, 2019, 5 pages.
"Extended European Search Report", EP Application No. 19219051.0, dated Jul. 23, 2020, 11 pages.
"Extended European Search Report", EP Application No. 20159899.2, dated Sep. 1, 2020, 11 pages.
Ba, "Blending Diverse Physical Priors with Neural Networks", Oct. 1, 2019, 15 pages.
Dequaire, et al., "Deep Tracking in the wild: End-to-end tracking using recurrent neural networks", Jun. 22, 2017, pp. 192-512.
Lee, et al., "DESIRE: Distant Future Prediction in Dynamic Scenes with Interacting Agents", Apr. 14, 2017, 10 pages.
Li, et al., "Fusion Modeling Method of Car-Following Characteristics", Nov. 2019, 8 pages.
Lin, et al., "Focal Loss for Dense Object Detection", Feb. 7, 2018, 10 pages.
Luo, et al., "Fast and Furious: Real Time End-to-End 3D Detection, Tracking and Motion Forecasting with a Single Convolutional Net", Jun. 2018, pp. 3569-3577.
Makansi, et al., "Overcoming Limitations of Mixture Density Networks: A Sampling and Fitting Framework for Multimodal Future Prediction", Jun. 8, 2020, 18 pages.
Min, et al., "RNN-Based Path Prediction of Obstacle Vehicles With Deep Ensemble", Jul. 23, 2020, 5 pages.
Musicki, et al., "Joint Integrated Probabilistic Data Association—JIPDA", Aug. 2004, pp. 1120-1125.
Park, et al., "Sequence-to-Sequence Prediction of Vehicle Trajectory via LSTM Encoder-Decoder Architecturef", Oct. 22, 2018, pp. 1672-1678.
Particke, et al., "Neural Network Aided Potential Field Approach for Pedestrian Prediction", 101/May 2019, 6 pages.
Sadeghian, et al., "SoPhie: An Attentive GAN for Predicting Paths Compliant to Social and Physical Constraints", Jun. 2018, pp. 1349-1358.
Zernetsch, et al., "Trajectory Prediction of Cyclists using a physical model and an artificial neural network", Jun. 2016, pp. 833-838.
Zhao, "Multi-Agent Tensor Fusion for Contextual Trajectory Prediction", Jul. 28, 2019, 9 pages.
"Extended European Search Report", EP Application No. 19202631.8, dated Apr. 16, 2020, 12 pages.
Alahi, et al., "SocialLSTM: Human Trajectory Prediction in Crowded Spaces", Jun. 2016, 11 pages.
Bahram, et al., "A Combined Model- and Learning-Based Framework for Interaction-Aware Maneuver Prediction", Abstract Only, Jan. 7, 2016, 2 pages.
Bansal, "ChauffeurNet: Learning to Drive by Imitating the Best and Synthesizing the Worst", Dec. 7, 2018, 20 pages.
Culurciello, "The fall of RNN / LSTM", Apr. 13, 2018, 10 pages.
Gupta, et al., "Social GAN: Socially Acceptable Trajectories with Generative Adversarial Networks", Mar. 29, 2018, 10 pages.
Kerfs, "Models for Pedestrian Trajectory Prediction and Navigation in Dynamic Environments", May 2017, 146 pages.
Lefevre, et al., "A Survey on motion prediction and risk assessment for intelligent vehicles", Jul. 2014, 20 pages.
He, "Deep Residual Learning for Image Recognition", Dec. 10, 2015, 12 pages.

* cited by examiner

METHOD AND SYSTEM FOR DETERMINING AN ATTRIBUTE OF AN OBJECT AT A PRE-DETERMINED TIME POINT

CROSS-REFERENCE TO RELATED APPLICATION

This application claims priority to European Patent Application Number 19202631.8, filed Oct. 11, 2019, the disclosure of which is hereby incorporated by reference in its entirety herein.

FIELD

The present disclosure relates to methods for determining (for example predicting) an attribute of an object at a pre-determined time point (for example a past time point or a future time point), for example for predicting a traffic situation in the future based on past traffic situations.

BACKGROUND

A human driver of a vehicle considers the surrounding traffic participants to make maneuver decisions. The human driver anticipates the future trajectories of the surrounding dynamic objects and the potential risk of collision subconsciously, constantly and instantly. At the same time, the human driver tries to follow the lane, and keep the vehicle in the center of the lane.

For at least partially autonomous vehicles, the vehicle itself is proposed to carry out all this processing, which requires information on the surrounding of the vehicle and of the vehicle itself.

Accordingly, there is a need to efficiently and reliable determine traffic situations.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining an attribute of an object at a pre-determined time point, the method comprising the following steps performed (in other words: carried out) by computer hardware components: determining data representing a respective property of the object and a plurality of further objects at a plurality of time points different from the pre-determined time point; arranging the data in an image-like data structure, the image-like data structure having a plurality of columns and a plurality of rows, wherein the data is arranged in the image-like data structure, so that each of one of the rows or the columns of the image-like data structure corresponds to respective properties of the object or of one of the plurality of further objects, and each of the other of the rows or the columns of the image-like data structure corresponds to respective properties at one of the plurality of time points; and determining the attribute of the object at the pre-determined time point using a pre-determined rule based on the image-like data structure.

In other words, data representing a respective property of a plurality of objects at a plurality of time points (in other words: the values of a property for a plurality of objects at a plurality of time points) may be arranged in an image-like data structure so that each column of the image-like data structure corresponds to properties of the plurality of objects at a single time point, and that each row of the image-like data structure corresponds to properties of a single object. Alternatively, the data representing the property of the plurality of objects at the plurality of time points may be arranged in the image-like data structure so that each row of the image-like data structure corresponds to properties of the plurality of objects at a single time point, and that each column of the image-like data structure corresponds to properties of a single object.

The attribute of the object may be of the same type as the properties of the further objects (for example, the respective property of each of the further objects may be a speed of the respective further object, and the attribute of the object may be a speed of the object), or of different type (for example, when the respective property of each of the further objects is a speed of the respective further object, the attribute of the object may be an attribute other than a speed of the object, for example a distance of the object to the middle of the lane of a road on which the object is located).

The attribute of the object may be a probability of an accident in which the object is involved, a probability of a collision involving the object, a location of the object, a speed of the object, a linear velocity of the object, a rotational speed of the object, a distance of the object to a middle of a lane on which the object is located, a lane driving direction of a lane in which the object is, a type of left and right markings of the lane in which the object is, a condition of the lane in which the object is, a breaking light status of the object, or a turning light status of the object.

The image-like data structure may have a format (for example data format) of an image. However, if the image-like data structure would be displayed by a method for displaying images, this would not lead to displaying an image showing an actual scene that could be interpreted by a human observer. Rather, the image-like data structure stores information related to properties of various objects (the object (which may also be referred to as the target object) and further objects). For example, each property may be indicated by a number, for example a real number or an integer number in the image-like data representation. It will be understood that the image-like data structure may also be referred to as image-like data representation or as image.

The expression "determining the attribute" may be understood as determining the attribute at a time point at which no information is available, neither information related to the object nor information (for example properties) of the other objects.

Each of the object and the further objects may be a vehicle (for example a car, a truck, a pickup truck, a bus, or a bicycle) or a pedestrian.

Each time point may be an instance of time. For example, the time points may be equally spaced, or may be randomly spread over a pre-determined period of time.

According to another aspect, the further objects may be located in a surrounding of the object. It has been found that taking into account further objects in a surrounding of the object enhances the determination (for example prediction) of the attribute of the object, since the object and objects in the surrounding of the object may interfere with each other, and thus the objects in the surrounding of the object may have an influence on the attribute of the object.

According to another aspect, the object may be a vehicle (which may be referred to as target vehicle). According to another aspect, the further objects may be vehicles located in neighboring lanes and/or a preceding vehicle and/or a following vehicle. It has been found that the vehicles located in neighboring lanes and/or a preceding vehicle and/or a following vehicle (for example preceding/following the target vehicle or preceding/following the neighboring vehicles) may have the most influence on the attribute of the target vehicle. For example, a preceding vehicle may have more influence on the attribute of the target vehicle than a vehicle on a next-to neighboring lane (for example on a lane next to the neighboring lane away from the lane on which the target vehicle is located, for example driving), even if the distance between the target vehicle and the preceding vehicle is larger than the distance between the target vehicle and the vehicle on the next-to neighboring lane.

Alternatively, the further objects may include a pre-determined number of vehicles closest to the target vehicle.

According to another aspect, the plurality of time points may include or may be or may be referred to as past time points, and the pre-determined time point may be a time point succeeding the plurality of time points, so that determining (for example predicting) the attribute may include or may be determining the attribute at a future time point.

According to another aspect, the plurality of time points may include or may be or may be referred to as future time points, and the pre-determined time point may be a time point preceding the plurality of time points, so that determining (for example predicting) the attribute may include or may be determining the attribute at a past time point.

According to another aspect, the plurality of time points may include or may be future time points, and the pre-determined time point may be a time point preceding the plurality of time points, so that determining (for example predicting) the attribute may include or may be determining the attribute at a past time point. For example, if future information is available (for which it may be known that a critical situation happened), but past information is not available, then the past information may be estimated to determine the past information.

According to another aspect, potential past tracks that converge to an observed realization at a given point in time may be explored. In other words, plausible timelines leading up to some event, for example an accident, may be explored. Using the method according to various embodiments in this context may allow exploring the most probable scenario (or most probable scenarios). Furthermore, the method according to various embodiments may be embedded into a GAN (generative adversarial network) setup (for example as the generator or the generative network of the GAN setup), which may allow use in various applications.

By using a data representation according to various embodiments, data that was collected from "critical situations", like accidents, may be used to learn conditions which lead to the accidents. The learned system may then be deployed online to detect such conditions and warn drivers in advance.

According to another aspect, the property may include or may be at least one of a location, a speed, a linear velocity, a rotational speed, an acceleration, a type of the object, a distance to a middle of a lane, a lane driving direction of a lane in which the object is, types (for example solid, dashed, etc.) of left and right markings of the lane in which the object is, the condition (for example wet, dry, etc.) of the lane in which the object is, a (possibly detected) breaking light status of the object, and a (possibly detected) turning light status of the object.

According to another aspect, a plurality of properties may be determined and arranged as different channels of the image-like data structure. This may allow using more than one property per object and per time point. The channels of the image-like data structure may be understood like color channels of an RGB (red-green-blue) image, or like the hue/saturation/lightness channels of an HSL (hue, saturation, lightness) image, or like the hue/saturation/value channels of a HSV (hue, saturation, value) image. It will be understood that the image-like data structure is not limited to having three channels, but may have any number of channels, for example 1 channel, or 2 channels, or 3 channels, or 4 channels, or any other integer number of channels.

According to another aspect, the pre-determined rule may take image data as input data. In other words, the pre-determined rule may be a rule which usually operates on images. Since the data representing the properties for the various objects at the various time points is arranged in the image-like data structure, the rule which usually operates on images may be used without modification or with minimum modification (for example to adapt to a number of channels different from 1 or different from 3).

According to another aspect, the pre-determined rule may include or may be a neural network, for example a convolutional neural network (CNN), for example a temporal convolution network (TCN). The neural network may be trained with training data comprising a plurality of training images, wherein each training image includes data arranged according to the image-like data structure, and wherein each training image is associated with a training attribute of the object.

According to another aspect, the computer implemented method may further comprise the following step carried out by the computer hardware components: assigning a pre-determined value to an entry of the image-like data structure if a property is not available for the object and the point of time corresponding to the entry.

It has been found that instead of providing several image-like data structures of different sizes (in particular when using neural networks, which have to be trained using training images of a fixed size which is identical to the size of images used during normal operation after training), a single, fixed size of the image-like data structure may be used, and entries (in other words: pixels) of the image-like data structure for which no information is available may be filled with a pre-determined value or flag (for example the value zero ("0")). For example, if the number of further objects is less than the maximum number of further objects that could be represented in the image-like data structure, for example when the number of rows of the image-like data structure is more than the number of further objects plus one (for the target object), the remaining rows (which are not assigned to the object or to any one of the further objects) may be filled with the pre-determined value. For example, if one of the further objects (or the target object) was not observed during a certain period of time, and as such no data representing the property of that further object (or of the target object) is available for the time points corresponding to the certain period of time, the respective entries of the image-like data structure may be filled with the pre-determined value.

Various embodiments may be applied to collision prediction and/or maneuver prediction and/or future trajectory prediction. For various levels of assisted or autonomous driving (for example L2/L3/L4 AD applications), the ego vehicle needs to plan its action in advance, and to do that, it needs to predict the other vehicles future trajectory in advance (to have convenient, safe path planning for ego vehicle). So the ego vehicle may consider any one of its neighbors as a "target object". Then, with one "target object" and the target object's neighbors, the method according to various embodiments may be applied. By considering the ego's neighbors as "target object" separately, the ego vehicle may predict the trajectories of all its neighbors individually (or separately). These trajectory information may then be used for ego vehicle path planning.

Furthermore, if the ego vehicle is directly set as the "target object" (instead of ego's neighbors"), then the predicted ego vehicle future trajectory may be the best trajectory for ego vehicle, and in this sense, the method according to various embodiments may provide a path planning function. If the method is trained using training data which are all from human drivers, this approach may be called "imitation learning". Then the trajectory prediction actually becomes "path planning".

According to another aspect, the computer implemented method may further comprise the following step carried out by the computer hardware components: estimating a potential risk of collision based on the determined attribute and/or determining a trajectory of the object to be followed for autonomous motion (for example for autonomous driving or assisted driving) of the object based on the determined attribute. It has been found that based on the determined attribute, a reliable and efficient estimation of a potential risk of collision and efficient determination of a desired trajectory is possible.

According to another aspect, the computer implemented method may further comprise the following steps carried out by the computer hardware components: determining a maneuver to be executed based on the determined attribute. It has been found that based on the determined attribute, a reliable and efficient determination of a maneuver to be executed may be carried out.

According to another aspect, the maneuver to be executed may include or may be at least one of: accelerating, braking, steering, changing lane to the left, changing lane to the right, outputting a warning indication, switching on hazard warning lights, or activating a horn.

In another aspect, the present disclosure is directed at a computer system, said computer system comprising a plurality of computer hardware components configured to carry out several or all steps of the computer implemented method described herein. The computer system can be part of a vehicle.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
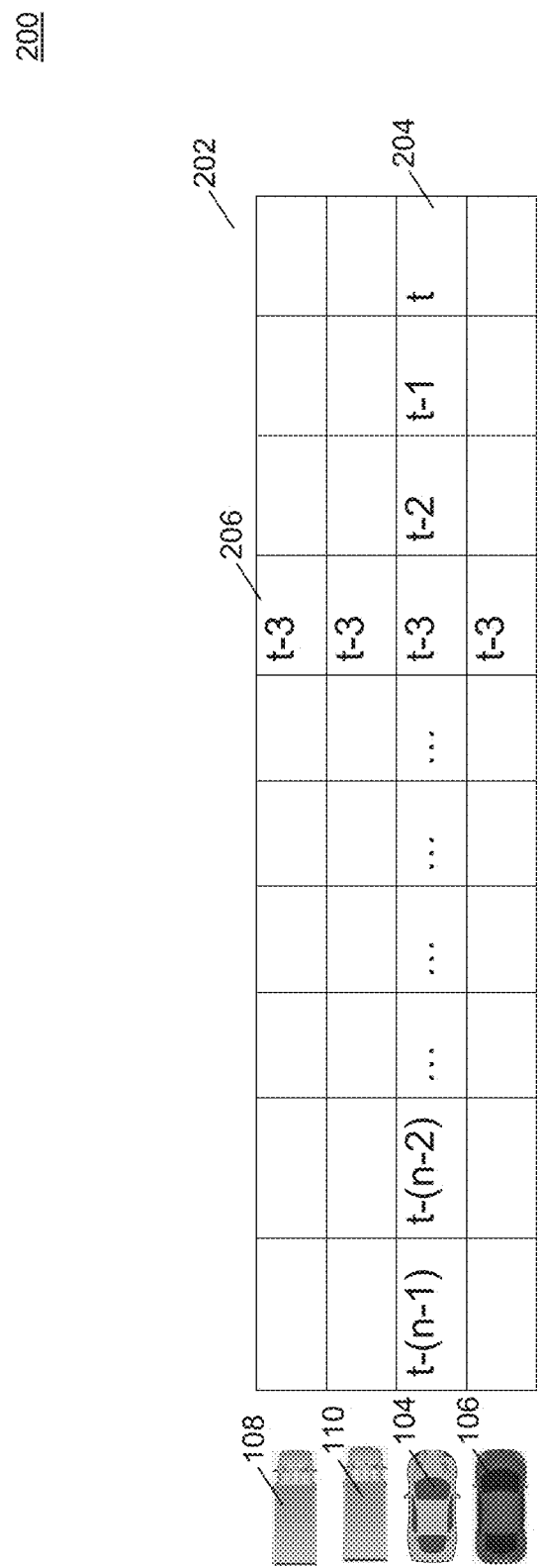
Figure 3:
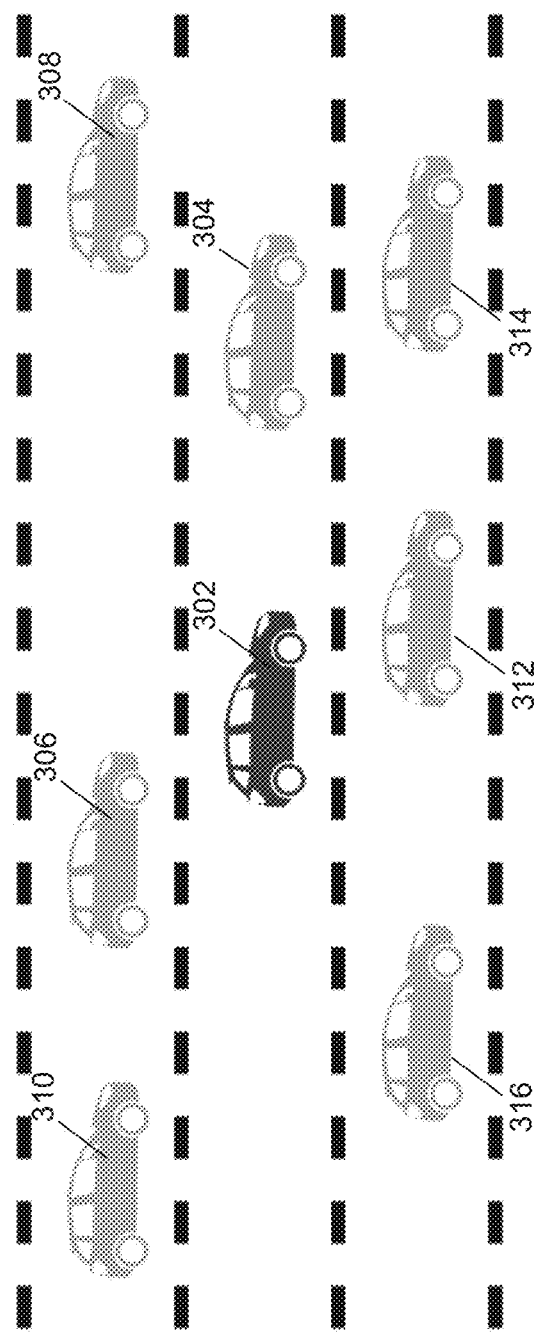
Figure 4:
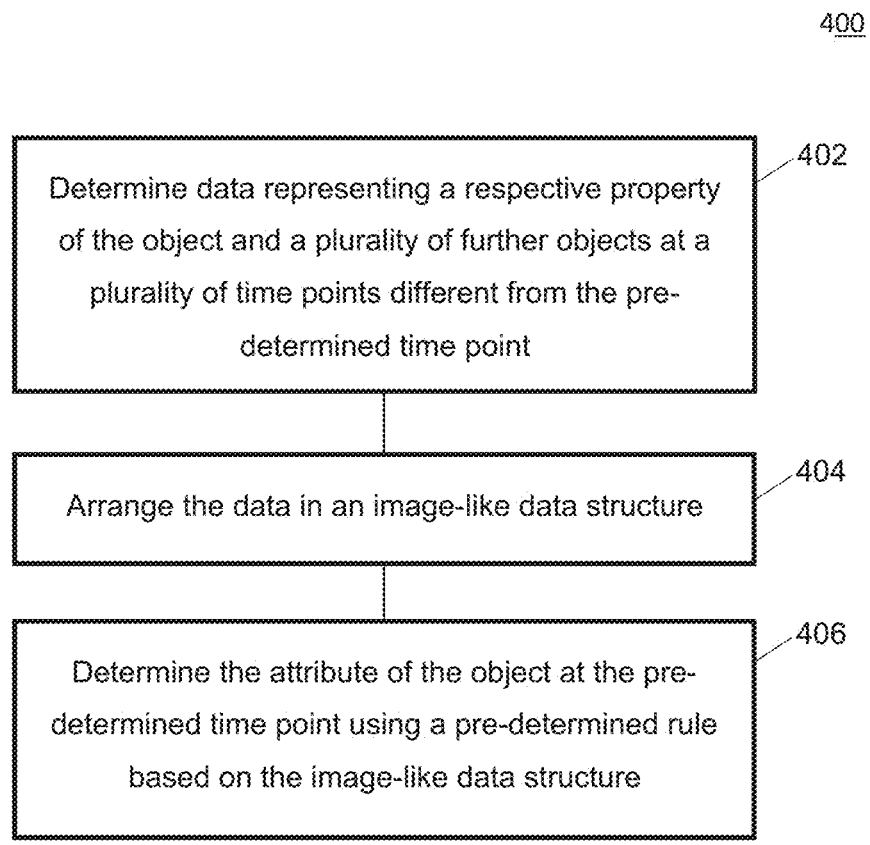

Exemplary embodiments and functions of the present disclosure are described herein in conjunction with the following drawings, showing schematically:

FIG. 1 an illustration of a traffic situation;

FIG. 2 an illustration of an image-like data structure according to various embodiments for the traffic situation illustrated in FIG. 1;

FIG. 3 an illustration of a scheme of defining the surrounding objects according to various embodiments; and FIG. 4 a flow diagram illustrating a method for determining an attribute of an object at a pre-determined time point according to various embodiments.

DETAILED DESCRIPTION

FIG. 1 shows an illustration 100 of a traffic situation (or driving scenario). Various vehicles are illustrated on a road 102. A first vehicle 104 may be the vehicle for which the future property or attribute, for example its future position and/or velocity, for example its future trajectory is to be predicted. The first vehicle 104 may be referred to as target or target vehicle. There are other vehicles around the first vehicle 104: a second vehicle 106 (which may be in the closest adjacent left lane to the first vehicle 104), a third vehicle 108 (which may be a leading truck in the front of the first vehicle 104), and a fourth vehicle 110 (which may be another truck in the closed adjacent right lane to the first vehicle 104).

The trajectories of the four vehicles 104, 106, 108, 110 (including the target vehicle) may be represented to form an image-like data structure, for example a 2D image-like data representation.

FIG. 2 shows an illustration 200 of an image-like data structure 202 according to various embodiments for the traffic situation illustrated in FIG. 1. In the image-like data structure 202:

- each row represents the trajectory of one object (for example of one vehicle); an exemplary row is indicated by reference sign 204;
- each column represents one time frame of the trajectories of the objects (for example assuming that t is the current time and n−1 past frames are demonstrated in FIG. 2, wherein n is an integer number); an exemplary column is indicated by reference sign 206;
- each entry in the image-like data structure 202 (wherein each entry may be referred to as pixel) stores the information (in other words: property) of a specific object at a specific past time frame (in other words: time point).

It will be understood that in the exemplary image-like data structure 202, the values of the property are not indicated, but the time point to which the respective pixel refers, and that only in exemplary pixels the time point is indicated. For example in column 206, all pixels are related to the properties at time point t−3 (in the first row of the third column 206 for the third vehicle 108, in the second row of the third column 206 for the fourth vehicle 110, in the third row 204 of the third column 206 for the first vehicle 104 (i.e. for the target vehicle), in the fourth row of the third column 206 for the second vehicle 106). For example in row 204, all pixels are related to the properties of the first vehicle 104 (at the various time points from t−(n−1) to t).

The time points are indicated by t, t−1, t−2, . . . t−(n−1), wherein t refers to the latest time point, and t−m (with an integer number m) refers to the time point that is m time points in the past.

The information (or property) may for example include position and/or velocity and/or acceleration, and/or type of the vehicle. If the property includes more than one value, the property values may be saved as multiple image channels, for example similar to the RGB (red, green, blue) color channels of a color image.

The number of the surrounding objects may correspond to the height of the image-like data structure (in other words: the number of rows of the image-like data structure). The length of the past history trajectory may correspond to the width of the image (in other words: the number of columns of the image-like data structure). Since in the exemplary traffic situation of FIG. 1, four vehicles 104, 106, 108, 110 are illustrated, and assuming that a total number of n time points are to be considered, the image-like data structure may be an image of size n by 4 (in other words, an image with n columns and 4 rows).

It will be understood that the columns and rows of the image-like data structure may be swapped, so that each column is related to one vehicle, and each row is related to one time point, and so that instead of an n by 4 image, the image-like data structure may be a 4 by n image.

While in the example of FIG. 2, the vehicles considered for the image-like data structure 202 are the vehicles 104, 106, 108, 110 illustrated in FIG. 1, in various embodiments, the number of vehicles may be different from the number of vehicles illustrated in FIG. 1 and FIG. 2, and any integer number of vehicles may be considered. Furthermore, various embodiments are not restricted to vehicles as relevant traffic participants; for example, pedestrians may be included into the consideration, so that one or more rows of the image-like data structure 202 are related to one or more pedestrians. Generally, any objects surrounding the target vehicle (for which the future property or attribute is to be estimated) may be considered. The surrounding objects and their impact on the target attribute (for example trajectory) estimation or prediction may be referred to as dynamic context. The road/lane information may be referred to as static context.

For example, the surrounding objects may be surrounding traffic participants, for example including a leading vehicle in front of the ego vehicle (in other words: in front of the target vehicle), incoming vehicles at the other side of the road, running by pedestrians, and/or close bicycles.

It may be desired to keep the row definition consistent throughout all processing, for example throughout all the training data when training a neural network. For example, in the example of FIG. 2, the data (in other words: information or properties) of the target vehicle (the first vehicle 104) may be stored in any row, for example the third row as illustrated in FIG. 2. It does not matter which row is actually set for the first vehicle 104, but then when such image (i.e. image-like data structure) is created from all the training data, the first vehicle 104 has to be stored always in the same row. This also applies to all the other objects (i.e. the further objects). Only when such consistency is assured in the data formation, a neural network may learn the relationship among them.

As an image, the image-like data structure needs to have fixed width and length. This means, the scheme to define the surrounding objects needs to be fixed. So the past trajectory length (width of an image) needs to be fixed. But this does not mean that such representation can only be used when the past trajectory length is greater than n. Any missing information (in other words: any missing frames) may be filled with a pre-determined value (in other words: flag), for example "0" in the image. This may be the same for the image height, so that the pre-defined surrounding objects do not need to be all existent. The image rows can be filled with 0. Likewise, if information on an object is available only for a certain number of time points, but not all n time points, the respective pixels corresponding to the time points for which no information is available, may be filled with the pre-determined value or flag.

For the example illustrated in FIG. 2, if there are no other objects or vehicles around the target, then only the target row (the third row in the example of FIG. 2) may have data (i.e. data entries or pixel values different from the pre-determined value or flag), and the first, second and last rows may be filled with the pre-determined value or flag (for example 0). If a vehicle is only detected for the last 10 frames, then the first n−10 columns of the image may be filled with the pre-determined value or flag, for example 0.

FIG. 3 shows an illustration 300 of a scheme of defining the surrounding objects according to various embodiments. For a target vehicle 302, the following objects may be chosen as surrounding objects to consider for prediction:
  the leading object 304 (for example vehicle)
  the closest object 306 (for example closest vehicle) in the
    adjacent left lane (i.e. the lane directly to the left of the
    lane on which the target is located);
  the leading object 308 and the following object 310 (for
    example leading and following vehicles) of the closest
    object in the adjacent left lane;
  the closest object 312 (for example closest vehicle) in the
    adjacent right lane (i.e. the lane directly to the right of
    the lane on which the target is located); and
  the leading object 314 and the following object 316 (for
    example leading and following vehicles) of the closest
    vehicle in the adjacent right lane.

By considering every object as a separate target, multiple such image-like data structures may be created for different objects. Thus, the devices and methods according to various embodiments may be repeatedly applied to all objects, including the ego vehicle.

For a highway AD (assisted driving) application scenario, a target may for example take one of the following three actions:
  straight forward driving (either acceleration or breaking);
  lane change left; or
  lane change right.

It can be seen that by choosing the vehicles in the ego and adjacent lanes according to a scheme as illustrated in FIG. 3, the vehicles which may affect making the above decision are all considered.

For example, when using the above scheme to choose the seven surrounding objects 304, 306, 308, 310, 312, 314, 316 (for example vehicles), together with the target vehicle 302, and using the 100 past trajectory frames (in other words: time points, for example time points t−99, t−98, . . . t−2, t−1, t), then a 100 by 8 image (which may have multiple channels, i.e. which may be a multiple channel image) may be defined.

It will be understood that various embodiments are not restricted to the scheme as illustrated in FIG. 3, but any scheme may be chosen, for example to balance between feasibility, simplicity and computational effort.

While in the exemplary description of FIG. 1, FIG. 2, and FIG. 3, the dynamic context integration has been addressed, the static context may also be integrated into the image-like data structure according to various embodiments. For example, for each vehicle, the lane information of the vehicle at each time frame may be used as property, for example in a separate channel of the image-like data structure (similar to an additional color channel of a conventional image). For example, the vehicle's left and right lane offsets at current location, lane marking types, may be used as features. Various features or properties may be provided for each pixel of the image-like data structure according to various embodiments. This may give the machine learning based network (for example the neural network, for example a temporal convolution network (TCN) as described below) also the possibility to learn the static context and interaction of the vehicles with it.

While a commonly used way to integrate the dynamic context for trajectory prediction is explicitly modeling the relationships among the objects, there are restrictions with such modeling: e.g. bad scalability, inaccurate modeling and high complexity for multiple objects.

The image-like data structure according to various embodiments may provide a convenient form to apply a neural network, for example a convolutional neural network (CNN), to learn the interaction among the objects (for example the vehicles), both in the spatial domain and in the temporal domain.

A Recurrent Neural Network (RNN) is one type of network, which may be applied for temporal data processing. This may make it and its various forms, such as LSTM (Long short-term memory)/GRU (Gated recurrent unit), an option for trajectory prediction problem. According to various embodiments, disadvantages of RNN based approaches, such as bad parallelism capability, big memory usage, and being hard to train, may be overcome by using convolutional network based approaches.

According to various embodiments, a Temporal Convolution Network based approach, which in principal is a CNN, may be used. According to various embodiments, the network may learn the interaction directly on the physical space (based on the image-like data structure): the spatial and temporal data all have physical meaning. For example, in one CNN layer:

If a 1*4 kernel is applied, it means the spatial relation among 4 vehicles at the same time frame is calculated by this kernel.

If a 4*1 kernel is applied, it means the temporal relation of one target cross 4 frames are calculated.

If a i*j kernel is applied, then spatial relations of j objects cross i time frames are calculated.

Multiple layers of CNN network can be applied: The receptive field of the kernels at higher layer may be increased. Thus, longer past history and multiple objects may be considered. Various techniques for CNN may be applied, such as dilated convolution.

A TCN may be a Convolutional Neural Network, wherein the data is temporal data, unlike the commonly used image data for CNN applications. Also for TCN application, a "causal convolution" may be used, which means that for the prediction of the future after time frame t, only the data before t (and optionally including t) is used: the network does not see the future to predict the future. According to various embodiments, the TCN may carry out a dynamic context integrated trajectory prediction task.

For the image-like data structure according to various embodiments, the width of the image (in other words: the number of columns) is a parameter that may be freely chosen, under the consideration of feasibility and computational burden. A shorter trajectory history (image width) may reduce the computational efforts.

Regarding the fixed height of the image (in other words: the number of rows of the image-like data structure), by defining a pre-determined number of surrounding objects and leaving the non-existing objects to be filled with a pre-determined value or flag (e.g. 0) in the training and online running, flexibility may be provided to cover various levels of assisted or autonomous driving, for example L2+/L3/L4 AD highway application scenarios.

In an example for a level 2 (L2) application, ACC (adaptive cruise control) needs to find potential vehicles which will cut-in the ego lane and thus the ACC can make adaption in advance and provide a smoother driving experience. One way to "predict" this cut-in is predicting the trajectory of the surrounding vehicles. Using the method according to various embodiments may provide that the dynamic and static-context are integrated into the prediction, and thus it may be possible to have a longer time horizon to predict such cut-in maneuvers.

In an example for level 3/level 4 (L3/L4) autonomous driving applications, the predicted trajectories may be used by the ego vehicle to plan its own future trajectory, to have smooth driving maneuvers and avoid possible dangers. Also if the target vehicle is the ego vehicle, and the training data are from human drivers, then the predicted trajectory may imitate the human driving behaviors, and the predicted trajectory may be the proposed driving path for motion planning in the autonomous driving vehicles.

FIG. 4 shows a flow diagram 400 illustrating a method for determining (for example predicting) an attribute of an object at a pre-determined time point according to various embodiments. At 402, data representing a respective property of the object and a plurality of further objects at a plurality of time points different from the pre-determined time point may be determined. At 404, the data may be arranged in an image-like data structure. The image-like data structure may have a plurality of columns and a plurality of rows. The data is arranged in the image-like data structure, so that each of one of the rows or the columns of the image-like data structure corresponds to respective properties of the object or of one of the plurality of further objects, and each of the other of the rows or the columns of the image-like data structure corresponds to respective properties at one of the plurality of time points. At 406, the attribute of the object at the pre-determined time point may be determined using a pre-determined rule based on the image-like data structure.

According to various embodiments, the further objects may be located in a surrounding of the object.

According to various embodiments, the object may be a vehicle.

According to various embodiments, the further objects may be vehicles located in neighboring lanes and/or a preceding vehicle and/or a following vehicle.

According to various embodiments, the plurality of time points may include or may be past time points; and the pre-determined time point may be a time point succeeding the plurality of time points.

According to various embodiments, the plurality of time points may include or may be future time points; and the pre-determined time point may be a time point preceding the plurality of time points.

According to various embodiments, the property may include or may be at least one of a location, a speed, a linear velocity, a rotational speed, an acceleration, a type of the object, a distance to a middle of a lane, a lane driving direction of a lane in which the object is, a type of left and right markings of the lane in which the object is, a condition of the lane in which the object is, a breaking light status of the object, and a turning light status of the object.

According to various embodiments, a plurality of properties may be determined and arranged as different channels of the image-like data structure.

According to various embodiments, the pre-determined rule may take image data as input data.

According to various embodiments, the pre-determined rule may include or may be a neural network.

According to various embodiments, the method may further include assigning a pre-determined value to an entry of the image-like data structure if a property is not available for the object and the point of time corresponding to the entry.

According to various embodiments, the method may further include estimating a potential risk of collision based on the determined attribute and/or determining a trajectory of the object to be followed for autonomous motion of the object based on the determined attribute.

According to various embodiments, the method may further include determining a maneuver to be executed based on the determined attribute.

According to various embodiments, the maneuver to be executed may include or may be at least one of: accelerating, braking, steering, changing lane to the left, changing lane to the right, outputting a warning indication, switching on hazard warning lights, or activating a horn.

Each of the steps 402, 404, 406, and the further steps described above may be performed by computer hardware components.

The methods and systems according to various embodiments may provide context-aware behavior prediction of vehicles and pedestrians. For example, the number and lengths of the time windows needed for the TCN to successfully predict the trajectories for t+1, etc., may be determined.

The image-like data structure provides a spatial- and temporal-2D data representation for context-aware trajectory prediction.

According to various embodiments, by forming the 2D image-like multi-channel data structure including the temporal and spatial trajectory of the surrounding objects, and learning the interaction among them using temporal convolution network approach, machine learning based object trajectory prediction regarding to surrounding objects may be provided. The network may incorporate the surrounding objects and the road lane information into the trajectory prediction, without explicit modeling of their relationships.

The image-like data representation for spatial and temporal vehicle data provides the possibility of using CNN techniques, such as TCN, to learn the relationships among multiple dynamic objects, for better trajectory prediction.

The data representation (for example the image-like data structure) may have a physical meaning, which may be used for dynamic-context aware learning for trajectory prediction. Depending on the use cases, the image size (in other words: the number of columns and rows of the image-like data structure) may be scaled up or down, to adapt the method for difference applications, or different hardware systems, which provides high flexibility.

It will be understood that the lane-based surrounding objects definitions used above are only examples. Any other scheme may be defined to choose the surrounding objects based on the application scenario. For example, for a crowded pedestrian trajectory prediction application, one may choose the n closed objects.

It will be understood that reference to "prediction" herein may refer to prediction of a value (for example an attribute) in the future (based on past information), or to prediction of a value (for example an attribute) in the past (based on future information).

What is claimed is:

1. A computer implemented method for determining an attribute of an object at a pre-determined time point, the method comprising the following steps carried out by computer hardware components:
   determining data representing respective properties of the object and a plurality of further objects at a plurality of time points different from the pre-determined time point;
   arranging the data in an image-like data structure, the image-like data structure having a plurality of columns, a plurality of rows, and a plurality of channels, wherein the data is arranged in the image-like data structure such that:
      each of one of the rows or the columns of the image-like data structure corresponds to the object or one of the plurality of further objects,
      each of the other of the rows or the columns of the image-like data structure corresponds to one of the plurality of time points,
      each of the channels corresponds to one of the plurality of properties, and
      the data for the object and the further objects is placed in respective specific rows or columns;
   determining the attribute of the object at the pre-determined time point using a pre-determined rule based on the image-like data structure, the pre-determined rule comprising a neural network that is configured to operate on images and has been trained using training images where channels correspond to image properties and using a plurality of training image-like data structures associated with the attribute, the training image-like data structures having data for similar objects placed in the respective specific rows or columns and having a same number of rows and columns as the image-like data structure; and
   performing a vehicle function of a vehicle based on the attribute of the object at the pre-determined time point, the vehicle function comprising at least one of:
      accelerating, braking, steering, changing lane to the left, changing lane to the right, outputting a warning indication, switching on hazard warning lights, or activating a horn.

2. The computer implemented method of claim 1, wherein the further objects are located in a surrounding of the object.

3. The computer implemented method of claim 1, wherein the method is performed by the vehicle.

4. The computer implemented method of claim 3, wherein the further objects comprise vehicles located in neighboring lanes, a preceding vehicle, or a following vehicle.

5. The computer implemented method of claim 3, wherein the object comprises a neighboring vehicle located in a neighboring lane, a preceding vehicle, or a following vehicle.

6. The computer implemented method of claim 1,
wherein the plurality of time points comprise past time points; and
wherein the pre-determined time point is a time point succeeding the plurality of time points.

7. The computer implemented method of claim 1,
wherein the plurality of time points comprise future time points; and
wherein the pre-determined time point is a time point preceding the plurality of time points.

8. The computer implemented method of claim 1,
wherein the property comprises at least one of a location, a speed, a linear velocity, a rotational speed, an acceleration, a type of the object, a distance to a middle of a lane, a lane driving direction of a lane in which the object is, a type of left and right markings of the lane in which the object is, a condition of the lane in which the object is, a breaking light status of the object, and a turning light status of the object.

9. The computer implemented method of claim 1, further comprising the following step carried out by the computer hardware components:
assigning a pre-determined value to an entry of the image-like data structure if a property is not available for the object and the point of time corresponding to the entry.

10. The computer implemented method of claim 1, further comprising generating another image-like data structure for one of the further objects,
wherein:
one of the further objects within the other image-like data structure comprises the object; and
determining the attribute of the object is based further on the other image-like data structure.

11. The computer implemented method of claim 1, wherein the channels of the training images correspond to red, green, and blue, respectively.

12. The computer implemented method of claim 1, wherein the channels of the training images correspond to hue, saturation, and lightness, respectively.

13. The computer implemented method of claim 1, wherein the channels of the training images correspond to hue, saturation, and value, respectively.

14. A computer system comprising computer hardware components configured to:
determine data representing respective properties of an object and a plurality of further objects at a plurality of time points different from a pre-determined time point;
arrange the data in an image-like data structure, the image-like data structure having a plurality of columns, a plurality of rows, and a plurality of channels, wherein the data is arranged in the image-like data structure such that:
each of one of the rows or the columns of the image-like data structure corresponds to the object or one of the plurality of further objects,
each of the other of the rows or the columns of the image-like data structure corresponds to one of the plurality of time points,
each of the channels corresponds to one of the plurality of properties, and
the data for the object and the further objects is placed in respective specific rows or columns;
determine an attribute of the object at the pre-determined time point using a pre-determined rule based on the image-like data structure, the pre-determined rule comprising a neural network that is configured to operate on images and has been trained using training images where channels correspond to image properties and using a plurality of training image-like data structures associated with the attribute, the training image-like data structures having data for similar objects placed in the respective specific rows or columns and having a same number of rows and columns as the image-like data structure; and
perform a vehicle function of a vehicle based on the attribute of the object at the pre-determined time point, the vehicle function comprising at least one of:
accelerating, braking, steering, changing lane to the left, changing lane to the right, outputting a warning indication, switching on hazard warning lights, or activating a horn.

15. The computer system of claim 14, wherein the further objects are located in a surrounding of the object.

16. The computer system of claim 14, wherein the computer system is comprised by the vehicle.

17. The computer system of claim 16, wherein the further objects comprise vehicles located in neighboring lanes, a preceding vehicle, or a following vehicle.

18. The computer system of claim 14,
wherein the plurality of time points comprise past time points; and
wherein the pre-determined time point is a time point succeeding the plurality of time points.

19. The computer system of claim 14,
wherein the plurality of time points comprise future time points; and
wherein the pre-determined time point is a time point preceding the plurality of time points.

20. A non-transitory computer readable medium comprising instructions that when executed configure computer hardware components of a computing system to:
determine data representing respective properties of an object and a plurality of further objects at a plurality of time points different from a pre-determined time point;
arrange the data in an image-like data structure, the image-like data structure having a plurality of columns, a plurality of rows, and a plurality of channels, wherein the data is arranged in the image-like data structure such that:
each of one of the rows or the columns of the image-like data structure corresponds to the object or one of the plurality of further objects,
each of the other of the rows or the columns of the image-like data structure corresponds to one of the plurality of time points,
each of the channels corresponds to one of the plurality of properties, and
the data for the object and the further objects is placed in respective specific rows or columns;
determine an attribute of the object at the pre-determined time point using a pre-determined rule based on the image-like data structure, the pre-determined rule comprising a neural network that is configured to operate on images and has been trained using training images where channels correspond to image properties and using a plurality of training image-like data structures associated with the attribute, the training image-like data structures having data for similar objects placed in the respective specific rows or columns and having a same number of rows and columns as the image-like data structure; and perform a vehicle function of a vehicle based on the attribute of the object at the pre-determined time point, the vehicle function comprising at least one of:
accelerating, braking, steering, changing lane to the left, changing lane to the right, outputting a warning indication, switching on hazard warning lights, or activating a horn.

* * * * *